Feb. 26, 1952  G. B. LOPER ET AL  2,587,346
HORIZONTAL COMPONENT LOW-FREQUENCY GEOPHONE
Filed Aug. 29, 1949  2 SHEETS—SHEET 1
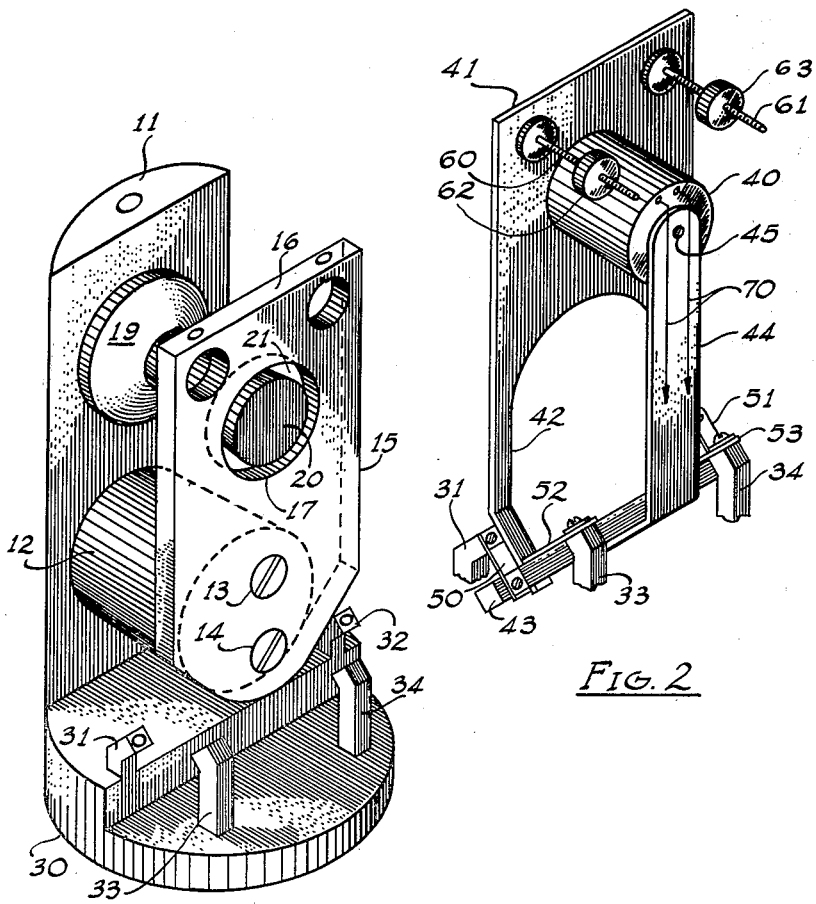
Fig. 1
Fig. 2
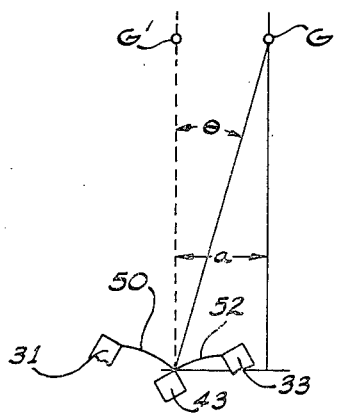
Fig. 4
GEORGE B. LOPER
STANLEY N. HEAPS
INVENTORS
BY D. Carl Richards
AGENT

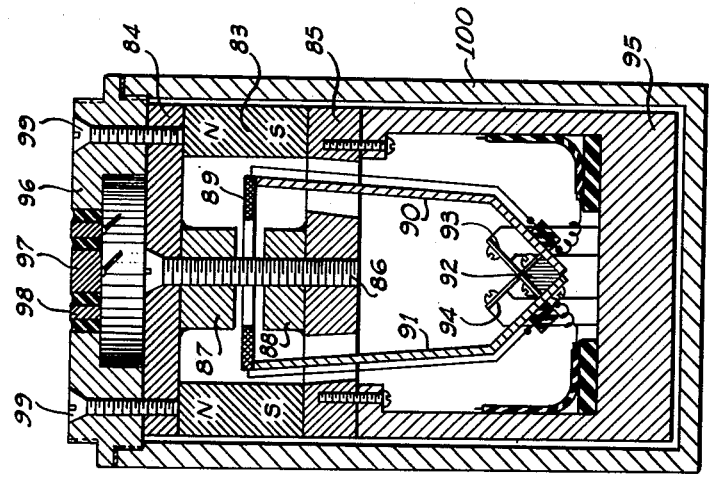

Patented Feb. 26, 1952

2,587,346

UNITED STATES PATENT OFFICE 2,587,346

HORIZONTAL COMPONENT LOW-FREQUENCY GEOPHONE

George B. Loper and Stanley N. Heaps, Dallas, Tex., assignors, by mesne assignments, to Socony-Vacuum Oil Company, Incorporated, New York, N. Y., a corporation of New York Application August 29, 1949, Serial No. 112,901

11 Claims. (Cl. 177—352)

This invention relates to vibration sensitive devices and more particularly to a physically small vibration detector having a low natural frequency sensitive to horizontal vibrations.

Though the invention may find application in a number of fields, it is particularly useful in the study of the properties of seismic waves, such as are generated by detonation of an explosive charge. Such waves are detected and recorded at a receiving point, spaced from the point of detonation of the explosive charge. The instantaneous voltage generated by a detector at such receiving point is proportional to the instantaneous vector sum of a function of all of the waves reaching the detector at a given instant. It is desirable in seismic exploration to record energy reflected from subsurface horizons to the substantial elimination of other waves. In order successfully to eliminate all waves other than the desired ones, their nature must be known. The present invention provides a tool for studying the horizontal vector component of waves in a frequency range extending to as low as two cycles per second.

The geophone of the present invention is sensitive to the horizontally travelling component of seismic waves and in one form is comprised of two relatively movable elements, one of which is a coil and the other a magnetic structure for establishing a magnetic flux linking the coil. The geophone is characterized by having means for providing a low natural frequency of vibration of one of the elements with respect to the other and includes suspension means for supporting one of the elements for relative movement with respect to the other element with resilient means exerting a restoring force upon such relative movement between the elements supporting the suspension for rotation about an axis substantially below the center of gravity of the suspension to oppose the restraining force exerted by the resilient means by a moment developed by the weight of the suspension acting through a lever arm which varies with and is substantially proportional to the relative movement between the elements.

For a more complete description of the invention, reference may now be had to the following description taken in conjunction with the accompanying drawings in which:

Fig. 1 is an isometric view of the magnet assembly;

Fig. 2 is a view of the coil assembly showing the resilient mounting therefor;

Fig. 3 is a sectional view of the geophone taken through the axis of symmetry of the magnet system;

Fig. 4 is a diagram illustrating the operation of the geophone; and

Fig. 5 is a modified form of geophone.

Referring now to Fig. 1, the magnet system in a preferred form of the geophone includes a plano-cylindrical bar 11 of low reluctance magnetic material. A permanent magnet 12, illustrated as of cylindrical shape, is fastened as by screws 13 and 14 to the plane face of the member 11 at a point intermediate the ends thereof. A flat pole piece 15 fastened to the end of the magnet 12 under screws 13 and 14 extends vertically and parallel to the plane face of the member 11. The upper edge 16 of the pole piece 15 in width is substantially equal to that of the member 11. The pole piece 15 is provided with a circular opening 17 near its upper end. A second pole piece 19 is fastened to the plane face of the member 11 above the magnet 12. The length of pole piece 19 is equal to the length of the magnet 12 plus the thickness of the pole piece 15. The end 20 of the pole piece 19 extends into the aperture 17 and is flush with the outer surface of the pole piece 15. An annular air gap 21 exists between the free end 20 of the pole piece 19 and aperture 17 of pole piece 15 across which the M. M. F. of the magnet 12 is effective to produce a high density flux.

A base member 30 is fastened to the bottom end of the plano-cylindrical member 11 and is disc shaped having a radius of curvature equal to that of the cylindrical portion of the member 11. Bottom disc 30 is milled away and has four spring mountings 31, 32, 33 and 34, associated therewith. The upper surfaces of mountings 31 and 32 slope at a 45° angle down and toward the mountings 33 and 34. The upper surface of the mountings 33 and 34 similarly slope down and toward the mountings 31 and 32. A plane common to the face of mountings 31 and 32 preferably intersects a plane common to the face of the mountings 33 and 34 at a point directly below the geometrical center of the pole piece 15.

The magnetic structure of Fig. 1 forms the movable member of the geophone which may be suitably coupled to the ground to vibrate therewith. The system illustrated in Fig. 2 comprises the steady member or pendulum supported from the mountings 31–34. The pendulum includes an elongated coil member 40 to be positioned for free vibration in the air gap 21, Fig. 1. More particularly, one end of the form for coil 40 threadedly engages a rigid supporting yoke 41, having forked depending arms, only one of which, the arm 42, may be seen. The arms of yoke 41 extend down to, and are carried by, a pivot bar 43. The other end of the coil 40 is fastened to a rigid supporting bracket 44 as by screw 45. The bracket 44 extends downwardly and is fastened to bar 43. Flat springs 50 and 51 mounted at one end on supports 31 and 32 are fastened at the other end to one face of the bar 43. Springs 52 and 53 carried by the supports 33 and 34 are fastened to an adjacent face of the bar 43. Thus mounted, the pendulum including coil 40 may rotate to a limited degree about an axis defined by the upper corner or edge of the bar 43. The springs 50–53 exert a restoring force upon the coil proportional to any deflection from the equilibrium position at which position the center of gravity of the coil suspension system is directly above the upper edge of the bar 43.

Referring to Fig. 3, the components of the geophone are shown in assembly form and enclosed in a container 60. The pendulum or coil structure is shown in its undeflected or equilibrium position. The upper edge of the supporting bar 43 is positioned vertically below the geometric center of the pole piece 15. Since the springs 50–53 support the weight of the coil suspension, they are maintained in tension at all times and thus may be of very light material, for instance, of Phosphor bronze or beryllium copper stock .004 inch thick. Upon deflection of the coil suspension from the equilibrium position, the springs exert a restraining force and tend to restore the coil to the equilibrium position. Within the elastic limit of the springs the restoring force is, of course, proportional to the deflection.

The advantage in positioning the axis of rotation below the center of gravity of the pendulum may best be understood by referring to the diagrammatic representation of Fig. 4. If the center of gravity G of the pendulum is displaced to an extreme position from the equilibrium position G', the weight acting through a lever arm $a$, which as long as the sine of angle $\theta$ equals $\theta$ (in radians) is proportional to the deflection, tends to offset or cancel the restoring force exerted by the springs 50–53. It will be recognized that for a given set of springs there will be a critical mass above which the pendulum will be unstable. However, the suspension weight may be made nearly equal to but less than the critical weight to effect a finite, positive, but low natural frequency system.

In Figs. 2 and 3, means for controlling the mass or rotational inertia and thus the natural frequency, and also for controlling the position of the center of gravity, is illustrated. Two bolts 60 and 61 are carried by the upper end of the yoke 41 and extend therefrom. Heavy slugs 62 and 63 are threaded on the screws 60 and 61, respectively. If, in Fig. 3, the slug 62 is served farther onto screw 61, the center of gravity of the suspension will be moved horizontally and to the left by an amount depending upon the relative mass of the slug and the rest of the suspension. The addition of more slugs would move the center of gravity vertically, and farther away from the axis of rotation, and increase the moment of inertia.

The geophone in the preferred form may be enclosed in a cylindrical housing for use in bore holes and comprises the plano-cylindrical member 11 extending longitudinally in the housing 60 supporting at its upper end the horizontal pole piece 19 which extends into aperture 21 in the pole piece 15. The magnet 12 and the pole piece 15 are supported from the member 11. The coil 40 is positioned in the air gap 21 and supported by springs 50–53 which tend to maintain the coil structure in its equilibrium position. For all positions other than equilibrium, the torque due to the weight of the coil suspension effectively cancels a portion of the restoring torque exerted by the springs thus producing a lower natural frequency than that dictated purely by the inertia of the system and the stiffness of the springs. The effect of gravity essentially lends a negative stiffness which decreases the net positive stiffness of the leaf springs.

Vibration of the coil 40 relative to the flux in the air gap 21 generates a voltage which is to be amplified and recorded. As illustrated in Fig. 3, leads 70 from the coil 40 follow the bracket 44 and terminate in an insulating block 71. Two conductors, one of which, the conductor 72, is shown, provide a conducting circuit from the terminal block 71 to output ring terminals 73 and 74. Brush contacts 75 and 76 may be utilized to connect the ring terminals 73 and 74 to an output circuit including amplifying and recording apparatus. The ring terminals 73 and 74 are carried by a cap 77. A portion 78 of the cap threadedly engages the upper end of the container 60, and is served onto a gasket 79 to seal the housing from moisture. The cap 77 may be fastened to the upper end of the member 11 as by a screw 80. Screws not shown may threadedly engage holes in the upper face of the pole piece 15 to lend additional support in the connection between the geophone assembly and the cap 77. A non-magnetic washer 77a forming a part of cap 77 prevents shunting of the magnetic flux around gap 21.

In Fig. 5, a second modification of the invention is illustrated. A permanent magnet 83 in the form of an annular ring is clamped between two discs 84 and 85 by a screw 86 which extends through the upper disc 84 and threadedly engages the lower disc 85. A cylindrical pole piece 87 is attached to disc 84 as by welding or other suitable means. Similarly, a pole piece 88 is attached to disc 85. The dimensions of the magnet 83 and pole pieces 87 and 88 are so chosen that there is an air gap of suitable length between the juxtaposed ends of the pole pieces in which there exists a magnetic flux due to the M. M. F. of the magnet 83. A coil 89 having a disc-like shape is positioned in the aforementioned air gap with its axis vertical, and is supported by brackets 90 and 91 for horizontal vibration. The brackets 90 and 91 are attached to and supported by a pivot bar 92 which is, in turn, supported by crossed leaf springs 93 and 94, permitting vibration of the coil 89 as in the modification of Figs. 1–3. The disc 85 is slotted for passage therethrough and free vibration of brackets 90 and 91. A cup 95, fastened to and carried by disc 85 is provided with the requisite supports for springs 93 and 94. The cap 96, carrying ring terminals 97 and 98, is fastened to the upper disc 84 by screws 99 and also is threaded into the upper end of a cylindrical housing 100. Suitable circuit means are provided to complete the circuit from the coil 89 to the ring terminals 97 and 98 for transmission of voltages generated to suitable amplifying and recording equipment.

In operation, either of the modifications of the invention above described may be clamped to or otherwise secured upon the vibrating body whose motion is to be studied. Where the detector is used in seismic studies, it may be buried or anchored in the near surface formations, or may be clamped at a predetermined depth in a drill hole. In spite of the very low frequency at which the geophone operates, the suspension is sufficiently small to permit its use in bore holes such as are used for shot holes in seismic exploration. Such holes ordinarily are in the order of 3½ inches in diameter. When used in a bore hole, a suitable clamping mechanism such as generically disclosed in Patent No. 2,428,168 to George B. Loper may be used.

In the study of wave motion, two geophones of the type herein described may be utilized to measure the two horizontal components of vibration. In such case they would be oriented with the axis of rotation perpendicular one to the other in a horizontal plane. A third geophone of the type disclosed in applicants' copending application, S. N. 112,902, filed August 29, 1949, may be added to the system of two horizontally sensitive geophones. The low frequency, vertically sensitive geophone in the above-identified case would detect components of the wave motion along the third or vertical axis.

Though the present invention has been illustrated in particular modifications, it is to be understood that further modifications within the scope of the invention as set forth in the appended claims may now suggest themselves to those skilled in the art.

What is claimed is:

1. A low frequency horizontal component geophone comprising a magnetic structure including a horizontal pole piece, a vertical pole piece having an aperture to receive one end of said horizontal pole piece with an air gap therebetween, vibratory means including a signal-generating coil enclosing a portion of said horizontal pole piece in said air gap, and resilient means forming a frictionless pivot for said vibratory means normally positioned vertically below the center of gravity of said vibratory means, the axis of said pivot being perpendicular to the axis of said horizontal pole piece, said resilient means exerting a restoring force on said vibratory means greater than the gravity moment when said center of gravity is displaced from a vertical plane which includes said pivot, said gravity moment being developed by the weight of said coil acting in opposition to said restoring force in magnitude proportional to said deflection substantially to reduce the net restoring force and to lower the natural period of said vibratory system.

2. A low frequency geophone sensitive to horizontal vibrations which comprises a magnet, a horizontal pole piece, a vertical pole piece having an opening therein to receive one end of said horizontal pole piece, a signal-generating coil positioned in said opening and encircling a portion of said horizontal pole piece, and mutually perpendicular tension bearing springs supporting said coil and forming a frictionless pivot displaced vertically below the center of gravity of said coil, the axis of said pivot being perpendicular to the axis of said horizontal pole piece whereby said springs produce a restoring moment on said coil greater than the gravity moment produced when the center of gravity thereof is displaced from a vertical plane which includes said pivot by the weight of said coil in opposition to said restoring moment and in magnitude proportional to the displacement to reduce the net restoring moment on said coil.

3. A low frequency horizontal component geophone enclosed in a cylindrical housing which comprises a plano-cylindrical member extending longitudinally in said housing, a horizontal pole piece supported at one end by the upper end of said plano-cylindrical member, a horizontal magnet supported from said plano-cylindrical member vertically below said horizontal pole piece, a vertical pole piece supported by said magnet having an opening therein to receive the free end of said horizontal pole piece with an air gap therebetween, a pendulum including a cylindrical signal-generating coil positioned in said air gap and encircling the free end of said horizontal pole piece, and crossed flat springs supporting said pendulum for rotation about a horizontal axis below and perpendicular to the axis of said horizontal pole piece.

4. A low frequency horizontal component geophone which comprises a magnet, a horizontal frusto-conical pole piece, a vertical pole piece including an opening to receive the base of said conical pole piece with an air gap therebetween, a low reluctance member supporting said conical pole piece from said magnet, a cylindrical signal-generating coil positioned in said air gap and encircling the base of said frusto-conical pole piece, and resilient means supporting said coil for rotation about a horizontal axis perpendicular to the axis of said coil.

5. A low frequency horizontal component geophone comprising a pendulum which includes a signal-generating coil mounted with its axis horizontal, means for providing a magnetic flux linking said coil, resilient means for mounting said pendulum for rotational vibration about an axis below the center of gravity of said pendulum and perpendicular to the axis of said coil of stiffness sufficient normally to maintain said pendulum in equilibrium with said center of gravity vertically above said axis, and means forming a part of said pendulum above said axis of rotation movable parallel to the axis of said coil to adjust the position of said center of gravity of said pendulum whereby said coil may be supported in equilibrium by said resilient means in predetermined relation to said axis of rotation and upon relative movement between said coil and said flux providing means signals are generated by said coil.

6. A low frequency horizontal component geophone comprising a pendulum which includes a signal-generating coil mounted at one end thereof with its axis horizontal, a permanent magnet structure having an air gap for providing magnetic flux linking said coil, resilient means supporting said pendulum for rotational vibration about an axis below the center of gravity of said pendulum and perpendicular to the axes of said coil and said air gap characterized by stiffness sufficient normally to maintain said center of gravity vertically above said axis, and a mass mounted on said pendulum above said resilient means and movable parallel to the axis of said coil to adjust the position of said center of gravity whereby said pendulum may be in equilibrium with said coil in predetermined relation to said air gap.

7. In a low frequency geophone adapted to be enclosed in a cylindrical housing of relatively small diameter the combination of a vertical supporting member of magnetic material, two projections extending therefrom with an air gap therebetween both of magnetic material and one comprising a permanent magnet for establishing flux in said air gap, a steady mass comprising a signal-generating coil having its turns symmetrically disposed about a horizontal axis coinciding with that of one of said projections, the turns of said coil extending a substantial distance on opposite sides of said air gap, rigid members secured to opposite ends of said coil and extending downwardly therefrom, one of said rigid members having an opening through its mid portion through which the other of said projections extends, two pairs of crossed springs having corresponding ends secured to the base extension of said vertical member and each pair of said crossed springs having the opposite corresponding ends extending adjacent the lower ends of said rigid members, said coil interconnecting said rigid members at their upper portion and means secured to the extended ends of said springs and interconnecting the lower ends of said rigid members to pivot them for movement of said coil in said flux for generation of seismic signals.

8. A low frequency horizontal component geophone comprising an inverted freely vibratory pendulum which includes a signal-generating coil adjacent the upper end thereof, means for providing a magnetic flux linking said coil, and resilient means for supporting said pendulum at the lower end thereof for rotational vibration of said coil in said flux and about a horizontal axis below said coil and below the center of gravity of said pendulum.

9. A low-frequency geophone comprising two elements, one a signal-generating coil and the other a magnetic structure establishing a magnetic flux linking said coil, an inverted pendulum support for one of said elements including resilient means acting upon said support to maintain it in a substantially vertical position and for exerting an increasing restoring force upon relative movement between said elements, said pendulum support and the element supported thereby having a center of gravity along the axis of said pendulum support when it is in vertical position, the moment resulting from relative movement between said elements opposing but not exceeding the restoring force of said resilient means for generation of seismic signals by said coil during continued relative movement between it and said magnetic structure.

10. A low-frequency geophone comprising two elements, one a signal-generating coil and the other a magnetic structure establishing a magnetic flux linking said coil, an inverted pendulum support for one of said elements including resilient means acting upon said support normally to maintain it in a substantially vertical position and for extering an increasing restoring force upon relative movement between said elements, said pendulum support and the element supported thereby having a center of gravity below said magne'ic structure and along the axis of said pendulum support when it is in vertical position, the moment resulting from relative movement between said elements opposing but not exceeding the restoring force of said resilient means for generation of seismic signals by said coil during continued relative movement between it and said magnetic structure.

11. In a low-frequency geophone adapted to be enclosed in a cylindrical housing of relatively small diameter the combination of a vertical supporting member of magnetic material, two projections extending therefrom with an air gap therebetween both of magnetic material, means for establishing magnetic flux in said air gap, a steady mass comprising a signal-generating coil having a horizontal axis coinciding with that of one of said projections, rigid members secured at their upper ends to opposite ends of said coil and extending downwardly therefrom, one of said members having an opening through a mid-portion through which the other of said projections extends, crossed flat springs mechanically supporting said rigid members at the lower ends thereof characterized by stiffness sufficient to exert a restoring force greater than the gravity moment of said rigid members and of said coil upon vibration of said geophone.

GEORGE B. LOPER.
STANLEY N. HEAPS.

REFERENCES CITED

The following references are of record in the file of this patent:

UNITED STATES PATENTS

| Number | Name | Date |
| --- | --- | --- |
| 1,749,023 | Edwards | Mar. 4, 1930 |
| 2,272,984 | Ritzmann | Feb. 10, 1942 |
| 2,390,187 | Sharpe | Dec. 4, 1945 |
| 2,408,478 | Petty | Oct. 1, 1946 |

OTHER REFERENCES

Irland, "A Study of Some Seismometers," pp. 14–18, U. S. Bur. of Mines, Technical Paper 556 pub. 1934.

"Film Recording Seismograph," Electronics, May 1943, pp. 89–92.